(No Model.)

O. W. KETCHUM.
STEAM GENERATOR.

No. 424,311. Patented Mar. 25, 1890.

WITNESSES

INVENTOR
O. W. Ketchum
per Geo. B. Robb
*Attorney*

UNITED STATES PATENT OFFICE.

OLIVER WILLIAM KETCHUM, OF TORONTO, ONTARIO, CANADA.

STEAM-GENERATOR.

SPECIFICATION forming part of Letters Patent No. 424,311, dated March 25, 1890.

Application filed January 10, 1889. Serial No. 296,038. (No model.)

*To all whom it may concern:*

Be it known that I, OLIVER WILLIAM KETCHUM, residing at the city of Toronto, Province of Ontario, Canada, and a subject of the Queen of Great Britain, have invented a new and useful Form of Boiler for the Generation of a Combination of Steam and Gases for Power and Heating Purposes, of which the following is a specification.

My invention relates to the production of a boiler in which gaseous fuel is consumed under pressure and the products of combustion are mixed with the steam produced from the water in the boiler, thereby doing away with the necessity for having a chimney or smoke-pipe, and also avoiding the waste of heat arising from the use of a chimney or escape-pipe for the products of combustion. My method of attaining these objects is clearly illustrated by the accompanying drawings, in which—

Figure 2:
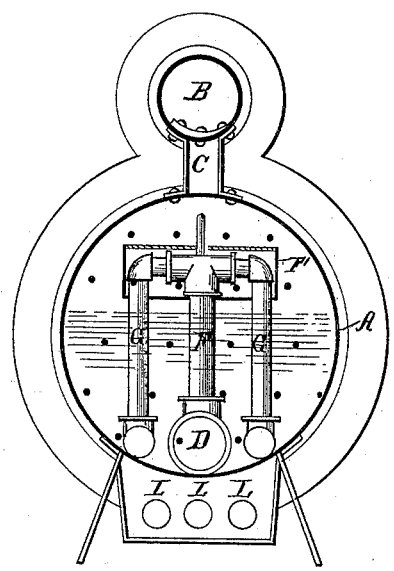
Figure 1:
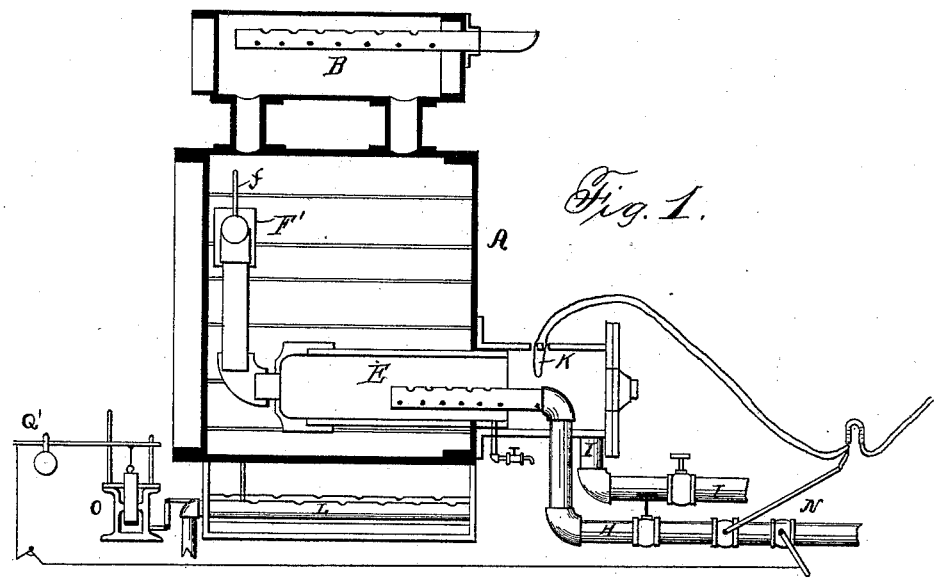

Figure 1 is a longitudinal section, and Fig. 2 is a transverse section.

By preference I have adopted the cylindrical shell with flat ends and a cylindrical dome above the main shell as the form of my boiler; but other forms might be used, and I do not limit myself to one form of construction of boiler.

Referring to the drawings, A is the cylindrical shell of the boiler, which may be of steel boiler-plate or other suitable material.

B is a dome above the shell, and C C are pipes connecting the dome to the shell A.

D is the combustion-chamber, which by preference is a circular tube of steel or iron and placed within the water-space of the boiler. It may, however, be outside and be separate from the boiler.

E is a body or quantity of refractory material, (shown on the drawings as a lining of the tube D;) but it may consist of numerous pieces placed loosely within the tube, or of both methods combined, the object being to have within the combustion-chamber a mass of material which will retain heat, and so cause the gas to be burned at a high temperature, and which in event of temporary stoppage of the supply of gas will help to ignite it on the return of the supply.

F is the discharge-pipe from D, (shown as rising inside the boiler above the water-line of the boiler and surrounded by a box F', into which the feed-water is pumped.) The object aimed at is to completely surround the pipe with water, so that the temperature of the pipe may be kept down and the heat absorbed by the water. The pipe F may terminate in this box and discharge the gases through the ends or sides of the box into the steam-space. The pipe F may connect with one or more pipes G G, and, returning below the water in the boiler, discharge the hot gases under and into the water. I prefer carrying the pipes down into the water and discharging the gases into the water through a number of perforations in a horizontal pipe, as by that means the escaping gases form a number of ascending streams in the water and more readily part with their excess of heat to the water. When the gases are to be discharged under water, a small pipe, as at *f*, must be made to rise above the water-level, in order to prevent the possibility of the pressure in the combustion-chamber ever becoming less than that in the steam-space, and so allow the water to be forced into the combustion-chamber. The gases from the combustion-chamber mix with steam from the water and fill the space above the water-level, from whence the mixed steam and gas may be taken off by any of the common arrangements of valves and pipes and used for any of the purposes for which steam is used.

H is a pipe conveying the gaseous fuel either from a receiver or from a force-pump, and discharging it into the combustion-chamber D at a pressure in excess of the pressure in the steam-space of the boiler.

I is another pipe supplying air in sufficient quantity to support combustion and at a pressure sufficient to cause it to flow into the combustion-chamber.

K is a wire of platinum or other suitable metal within the combustion-chamber and connected by wires to an electric dynamo, so that the gas may be ignited either by an electric spark or by raising the temperature of the wire K sufficiently high to cause ignition.

The pipes H and I are fitted with regulating-valves and check-valves to prevent any back currents. In cases where a continuous current of electricity is maintained to keep the wire K hot, I place in the gas-supply pipe a valve or cock $h$, which is held open by an electric magnet, and is so arranged that on a failure of the electric current the magnet loses its power and the weight of the lever causes the valve to shut off the supply of gas. The object of this is to prevent an accumulation of unburned gas within the boiler. I also consider it desirable to place in the gas-supply pipe the valve or cock N, connected to and operated by the plunger or piston O. This plunger or piston is exposed to the pressure of the boiler, and is held down against the pressure by a lever and weight O', or by other suitable means, and is so arranged that on the pressure reaching a certain desired amount the plunger or piston will rise, and by so doing will close the valve N and cut off the supply of fuel or diminish it. On the pressure decreasing the plunger or piston O will descend and so reopen the valve.

L L, &c., are gas-pipes with burners placed under the external shell of the boiler to be used when starting the apparatus, so that steam may be raised of sufficient pressure to work the pumps required for the air and gas supplies.

The boiler is furnished with the usual appliances, such as safety-valve, pressure-gage, water-gages, feed-water valves, and blow-off cock.

The following is the mode of operation: A supply of water having been placed in the boiler, steam is raised by the use of the gas-jets L L, &c. When a sufficient pressure is obtained and the electric current established, so that the wire K may ignite the gas on its entering the combustion-chamber, gas and air are forced into the combustion-chamber, where the gas burns, and as more gas and air are forced in the pressure in the combustion-chamber becomes greater than in the steam-space, and the products of combustion, passing through the pipe F, mix with the steam, or, passing through the pipes F and G G, are discharged into the water, through which they ascend into the steam-space. The heat from the combustion-chamber and the pipes from it, as well as from the gases entering the water and passing through it, causes the production of steam.

What I claim as my invention, and desire to secure by Letters Patent, is—

1. The combination of the closed chamber D, having the air and gas supply pipes, the pipe F, and the feed-water box F', through which the pipe F passes, substantially as described.

2. The combination of the closed chamber, having the air and gas supply pipes and the electrically-charged wire K, the pipe F, and the feed-water box F', through which the pipe F passes, substantially as described.

3. The combination of the closed chamber D, the air-pipe entering said chamber, the gas-supply pipe having cock $h$, and the electrically-charged wire extending into said chamber and having an armature connected with the cock, substantially as described.

4. The combination of the closed chamber D, having the air and gas supply pipes, the pipe F, having the extension $f$, and the feed-water pipe F', substantially as described.

5. The combination of the closed chamber D, having the air and gas supply pipes, the pipe F, and the downward extensions G, substantially as described.

Toronto, January 5, 1889.

OLIVER WILLIAM KETCHUM.

Witnesses:
   JNO. C. GOUGH,
   A. FRASER.